(No Model.)

W. STEPHENS.
DRIVE CHAIN.

No. 322,653. Patented July 21, 1885.

WITNESSES:
Donn Turtchell
C. Sedgwick

INVENTOR:
W. Stephens
BY Munn & Co
ATTORNEYS.

N. PETERS, Photo-Lithographer, Washington, D. C.

UNITED STATES PATENT OFFICE.

WILLIAM STEPHENS, OF NEW RICHMOND, WISCONSIN.

DRIVE-CHAIN.

SPECIFICATION forming part of Letters Patent No. 322,653, dated July 21, 1885.

Application filed April 7, 1885. (No model.)

*To all whom it may concern:*

Be it known that I, WILLIAM STEPHENS, of New Richmond, in the county of St. Croix and State of Wisconsin, have invented a new and Improved Drive-Chain Link, of which the following is a full, clear, and exact description.

My invention relates to certain improvements in the construction of drive-chain links adapted to be separated from each other, and the invention consists in such construction of the links that they may be locked to and unlocked from each other only when brought to a certain unusual position, as hereinafter described.

Reference is to be had to the accompanying drawings, forming part of this specification, in which similar letters of reference indicate corresponding parts in all the figures.

Figure 1:
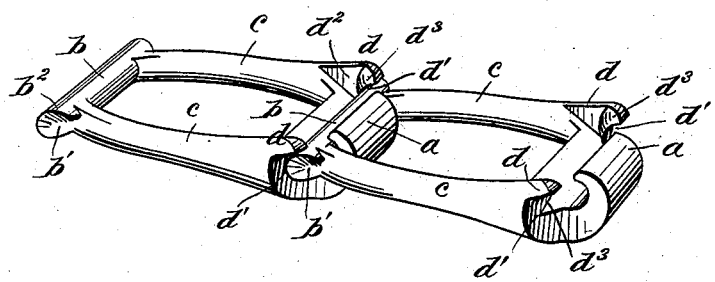
Figure 3:
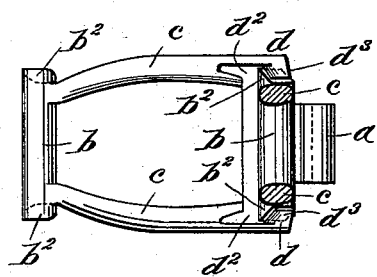
Figure 2:
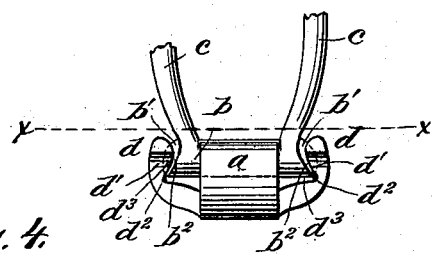
Figure 4:
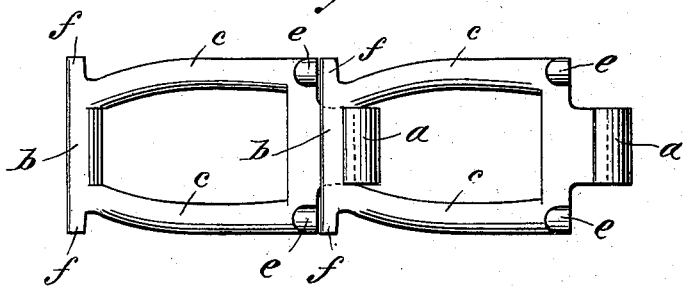

Figure 1 is a perspective view of two connected links made in accordance with my invention. Fig. 2 is an end elevation showing the links in position for disconnecting them. Fig. 3 is a sectional plan view on line $x\ x$ of Fig. 2. Fig. 4 is a plan view of two connected links showing a modification of the lock, and Fig. 5 is an edge view of the same, the position for unlocking being illustrated in dotted lines.

My new chain-links are each formed with a hook, $a$, at one end and with a bar, $b$, at the other. The hook $a$ is made narrower than the link, but the bar $b$ projects at each end past the side piece $c\ c$ of the link, as shown.

In the form of links shown in Figs. 1, 2, and 3, the ends of the bar $b$ are made concaved, as shown at $b'$, forming shoulders or lips $b^2$ at the ends of the bar $b$, as shown clearly in Fig. 1, which shoulders act, in connection with the projections $d\ d$, for locking the bar $b$ in the hook $a$ when two links are put together. The projections $d$ are made concaved at $d'$ to fit over the circular surface of the bar $b$, and are undercut upon their inner surfaces, as shown at $d^2$, to form the lips $d^3$, that prevent the bar $b$ from leaving hook $a$ except when the bars $c\ c$ of one link stand at right angles to the corresponding bars $c\ c$ of the other link, as shown in Figs. 2 and 3. In this position the end lips, $b^2$, of the bar $b$ enter the spaces $d^2$, as shown in Fig. 2, which permit the bar $b$ to be carried from under the hook $a$, and when carried partially from under the hook $a$ the projections $d^3$ will occupy the concaved spaces $b'$ at the ends of the bar $b$, so that in order to fully detach the links the bar $b$ must be turned back to turn the lips $b^2$ at the ends of the bar $b$ from under the lips $d^3$. For connecting the links the reverse of this operation will be followed.

Figure 5:
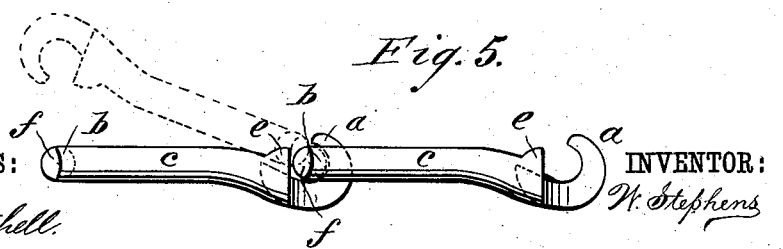

In the form of links shown in Figs. 4 and 5, plain shoulders $e\ e$ are formed in front of the opening or entrance to the hook $a$, and the ends of the bar $b$ that project past the side bars $c\ c$ of the link are cut away in front to form eccentrics $f\ f$, which, in connection with the shoulders $e$, serve to lock the bar $b$ in the hook $a$, except when one link is turned to the position shown in dotted lines in Fig. 5, in which position the bar $b$ may be lifted free from the hook $a$ and shoulders $e$, as will be understood from Fig. 5.

Constructed as described, the links may be easily connected and disconnected, and when put together are locked so that they will not disconnect of their own accord, and when made of malleable cast iron they may be cast without using a core.

Having thus described my invention, what I claim as new, and desire to secure by Letters Patent, is—

The drive-chain link herein shown and described, formed at one end with the hook $a$ and shoulders $d\ d$, undercut at $d^2$ to form lips $d^3$, and formed at the other end with the bar $b$, made concaved at its ends to form the locking-lips $b^2$, substantially as and for the purposes set forth.

WILLIAM STEPHENS.

Witnesses:
L. A. ELBERT,
CHARLES DONOHUE.